United States Patent
Ciaramitaro et al.

(10) Patent No.: US 7,130,858 B2
(45) Date of Patent: Oct. 31, 2006

(54) SYSTEM AND METHOD FOR ELECTRONICALLY MANAGING PRIVILEGED AND NON-PRIVILEGED DOCUMENTS

(75) Inventors: Barbara L. Ciaramitaro, Grosse Pointe Woods, MI (US); Michael A. Gruskin, West Bloomfield, MI (US); Edward C. Wolfe, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/884,014

(22) Filed: Jul. 2, 2004

(65) Prior Publication Data

US 2005/0004951 A1 Jan. 6, 2005

Related U.S. Application Data

(60) Provisional application No. 60/485,540, filed on Jul. 8, 2003, provisional application No. 60/484,731, filed on Jul. 3, 2003.

(51) Int. Cl.
*G06F 17/30* (2006.01)

(52) U.S. Cl. .................. 707/101; 707/10; 707/102; 707/103 R; 707/104.1

(58) Field of Classification Search .................. 707/9, 707/10, 100, 102, 103, 104.1, 101, 103 R; 713/200; 714/38

See application file for complete search history.

(56) References Cited

U.S. PATENT DOCUMENTS

| | | | | |
|---|---|---|---|---|
| 5,835,919 A | * | 11/1998 | Stern et al. ................. | 715/515 |
| 5,838,966 A | * | 11/1998 | Harlan ........................ | 715/866 |
| 5,898,434 A | * | 4/1999 | Small et al. ................. | 715/810 |
| 5,903,646 A | * | 5/1999 | Rackman ..................... | 705/51 |
| 5,930,801 A | * | 7/1999 | Falkenhainer et al. .. | 707/103 R |
| 6,044,373 A | * | 3/2000 | Gladney et al. .............. | 707/10 |
| 6,138,119 A | * | 10/2000 | Hall et al. ...................... | 707/9 |
| 6,236,996 B1 | * | 5/2001 | Bapat et al. ................... | 707/9 |
| 6,343,297 B1 | * | 1/2002 | D'Anjou et al. ......... | 707/104.1 |
| 6,594,671 B1 | * | 7/2003 | Aman et al. ............ | 707/103 R |
| 2001/0025311 A1 | * | 9/2001 | Arai et al. ................... | 709/225 |
| 2001/0034845 A1 | * | 10/2001 | Brunt et al. ................. | 713/201 |
| 2001/0042075 A1 | * | 11/2001 | Tabuchi ....................... | 707/500 |
| 2002/0046350 A1 | * | 4/2002 | Lordemann et al. ........ | 713/201 |
| 2002/0099954 A1 | * | 7/2002 | Kedma et al. .............. | 713/200 |
| 2003/0093409 A1 | * | 5/2003 | Weil et al. ...................... | 707/3 |
| 2004/0208316 A1 | * | 10/2004 | Wack et al. .................. | 380/44 |
| 2005/0015672 A1 | * | 1/2005 | Yamada ........................ | 714/38 |

* cited by examiner

*Primary Examiner*—Thuy N. Pardo
(74) *Attorney, Agent, or Firm*—Kathryn A. Marra

(57) ABSTRACT

A system and method for electronically managing privileged and non-privileged documents in two independent schemas. One schema is a privileged schema for storing privileged documents and the other schema is a non-privileged schema for storing non-privileged documents. The two schemas are separate and distinct so that privileged and non-privileged documents are not commingled. Access to the privileged schema is restricted to privileged users while non-privileged users have access only to the non-privileged schema. As a result, privileged documents are protected against the inadvertent waiver of privilege.

35 Claims, 6 Drawing Sheets

| | ACTION | NON-PRIVILEGED SCHEMA | PRIVILEGED SCHEMA — 208 |
|---|---|---|---|
| 602 | PARTIAL PRIVILEGE APPLIED TO A NON-PRIVILEGED DOCUMENT | REDACTED DOCUMENT IMAGE FOLDER INFO PRIVILEGE INFO ANNOTATION DATA DOCUMENT INFO | COPY: ORIGINAL DOCUMENT IMAGE FOLDER INFO PRIVILEGE INFO ANNOTATION DATA DOCUMENT INFO |
| 604 | NEW PARTIAL PRIVILEGE APPLIED TO A PARTIALLY PRIVILEGED DOCUMENT | NEW REDACTED DOCUMENT IMAGE FOLDER INFO PRIVILEGE INFO ANNOTATION DATA DOCUMENT INFO | UPDATE: FOLDER INFO PRIVILEGE INFO ANNOTATION DATA |
| 606 | FULL PRIVILEGE APPLIED TO A NON-PRIVILEGED DOCUMENT | PLACEHOLDER SUBSET OF DOCUMENT INFO | MOVE: ORIGINAL DOCUMENT FOLDER INFO PRIVILEGE INFO |
| 608 | FULL PRIVILEGE APPLIED TO A PARTIALLY PRIVILEGED DOCUMENT | PLACEHOLDER SUBSET OF DOCUMENT INFO | UPDATE: ORIGINAL DOCUMENT FOLDER INFO PRIVILEGE INFO |

210

| ACTION | NON-PRIVILEGED SCHEMA 210 | PRIVILEGED SCHEMA 208 |
|---|---|---|
| 602 — PARTIAL PRIVILEGE APPLIED TO A NON-PRIVILEGED DOCUMENT | REDACTED DOCUMENT IMAGE FOLDER INFO PRIVILEGE INFO ANNOTATION DATA DOCUMENT INFO | COPY: ORIGINAL DOCUMENT IMAGE FOLDER INFO PRIVILEGE INFO ANNOTATION DATA DOCUMENT INFO |
| 604 — NEW PARTIAL PRIVILEGE APPLIED TO A PARTIALLY PRIVILEGED DOCUMENT | NEW REDACTED DOCUMENT IMAGE FOLDER INFO PRIVILEGE INFO ANNOTATION DATA DOCUMENT INFO | UPDATE: FOLDER INFO PRIVILEGE INFO ANNOTATION DATA |
| 606 — FULL PRIVILEGE APPLIED TO A NON-PRIVILEGED DOCUMENT | PLACEHOLDER SUBSET OF DOCUMENT INFO | MOVE: ORIGINAL DOCUMENT FOLDER INFO PRIVILEGE INFO |
| 608 — FULL PRIVILEGE APPLIED TO A PARTIALLY PRIVILEGED DOCUMENT | PLACEHOLDER SUBSET OF DOCUMENT INFO | UPDATE: ORIGINAL DOCUMENT FOLDER INFO PRIVILEGE INFO |

*FIG. 6*

SYSTEM AND METHOD FOR ELECTRONICALLY MANAGING PRIVILEGED AND NON-PRIVILEGED DOCUMENTS

CROSS REFERENCE TO RELATED APPLICATIONS

This application claims priority to U.S. Provisional Application Ser. No. 60/484,731, filed Jul. 3, 2003 and to U.S. Provisional Application Ser. No. 60/485,540, filed Jul. 8, 2003, which are incorporated by reference herein in their entirety.

BACKGROUND OF THE INVENTION

The present disclosure relates generally to managing privileged documents and, in particular, to a system and method for electronically managing privileged and non-privileged documents for litigation support.

Legal matters often involve large volumes of information that must be organized and categorized in response to particular inquires or issues, such as litigation pleadings, business transactions, government regulations, and other legal matters. The information can include privileged, non-privileged and partially privileged documents which are typically managed by a centralized organization, such as a legal department or group therein having document coordinators.

The management of privileged documents in an electronic storage system poses several legal and technical challenges. The electronic storage system must be designed to protect legal claims of privilege and not allow the inadvertent waiver of privilege. The commingling of privileged and non-privileged documents in an electronic storage system can result in the inadvertent waiver of privilege. Current litigation systems do not prevent the commingling of privileged and non-privileged documents in an electronic storage system. Although users are able to mark a record, or document, as privileged, the record continues to reside in the same repository as non-privileged documents. It would be desirable for an electronic storage system, along with any supporting data repositories, to protect all privilege claims and allow for the separation of privileged and non-privileged documents.

In addition to separating privileged and non-privileged documents, it would also be desirable for an electronic storage system to allow for real-time identification of privileged material and the immediate real-time transfer of the identified privileged material to a dedicated privileged schema and the real-time removal of the privileged material from the non-privileged schema. Further, it would be desirable for an electronic storage system to provide a notification to users when the privileged status has changed or is under consideration for change to prevent inadvertent disclosure of privileged information. In addition, it would be desirable for an electronic storage system to allow for production of privileged documents from the privileged schema when required by law or court order.

BRIEF DESCRIPTION OF THE INVENTION

According to one aspect of the invention, a system and method are provided for electronically managing privileged and non-privileged documents in two independent schemas, a privileged schema for storing privileged documents and a non-privileged schema for storing non-privileged documents. The two schemas are separate and distinct so that privileged and non-privileged documents are not commingled. Access to the privileged schema is restricted to privileged users while non-privileged users have access only to the non-privileged schema. As a result, privileged documents are protected against the inadvertent waiver of privilege.

In another aspect of the invention, a system and method are provided for electronically managing documents as partially privileged where only a portion of a document is privileged while the remainder of the document is non-privileged. In such case the entire document is stored in the privileged schema where the full content, privileged as well as non-privileged, is accessible to privileged users. Additionally, the document, with the privileged portion removed, is stored in the non-privileged schema where the non-privileged content, but not the privileged content, is accessible to non-privileged users.

In a further aspect of the invention, a system and method are provided for electronically managing the designation of a document or portion thereof as privileged. Specifically, when a privilege designation is proposed by a user for a document stored in the non-privileged schema, a hold is immediately placed on the document which prevents the document from being inadvertently produced and the proposed privilege status is noticed to users and approvers who access the document. After approval of the proposed privilege designation by an approver, the full content of the document is immediately transferred from the non-privileged schema to the privileged schema and all privileged content of the document is removed from the non-privileged schema. Where an entire document is privileged and transferred from the non-privileged schema to the privileged schema, a placeholder may be left in the non-privileged schema indicating that the document is stored in the privileged schema. The user and approver may be the same or different persons. Through this disciplined and sequenced procedure, errors in managing the designation of a document as privileged and the inadvertent production of the document and consequent waiver of privileged are minimized.

In yet other aspects of the invention, a system and method for electronically managing privileged documents provide for real-time transfer of privileged content from the non-privileged schema to the privileged schema, for notification to users when the privilege status of a document has changed or is proposed for change, and for recordation of the history of privilege status designations for a document.

BRIEF DESCRIPTION OF THE DRAWINGS

Referring to the exemplary drawings wherein like elements are numbered alike in the several FIGURES:

FIG. 6 is a table of exemplary privilege status modification actions and their impact on the non-privileged schema and the privileged schema.

DETAILED DESCRIPTION OF THE INVENTION

Figure 1:
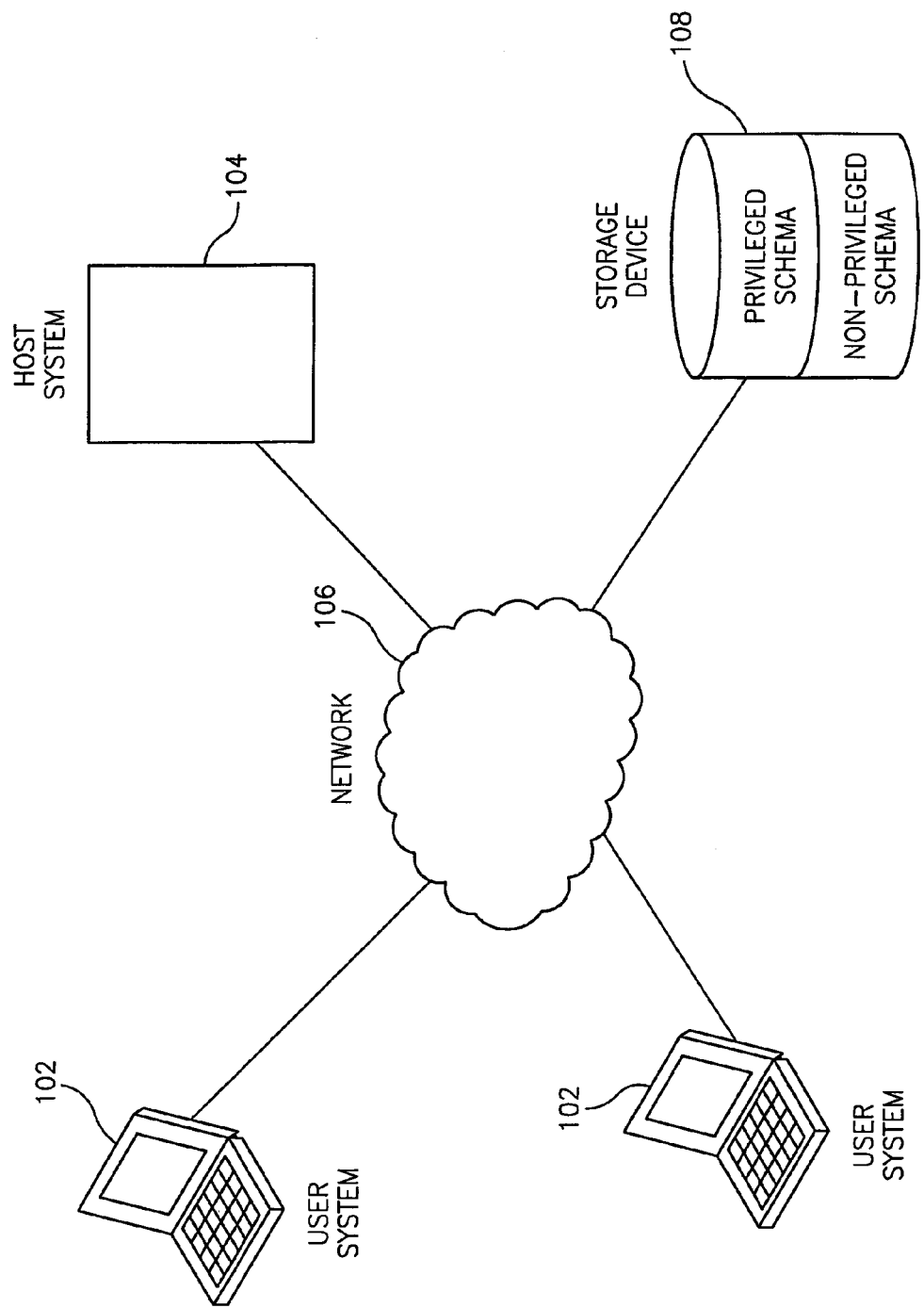
FIG. 1 is a block diagram of an exemplary system for managing privileged documents.

Referring to FIG. 1, a block diagram of an exemplary system for managing privileged documents is generally shown. The system includes a litigation support application (LSA) that is executed by one or more computer programs located on the host system 104. The LSA manages litigation information and provides computer processes to perform activities in support of legal matters. In particular, the LSA supports the collection, storage, retrieval and review of discovery information for litigation, regulatory or other matters where discovery information needs to be assembled. Discovery information includes documents that may be in any form such as drawings, test results, reports, letters, data, computer files and records.

The computer programs to execute the privileged document management functions are located on the host system 104. Legal discovery in a litigation requires that privileged documents be managed in such a way that their privilege claim is not waived through inadvertent disclosure. In order to support this requirement, an embodiment of the present invention provides a method to identify documents that contain privileged content and to restrict access to the documents that contain privileged content. In addition, exemplary embodiments of the present invention provide controls to aid in protecting documents with privileged content from inadvertent disclosure.

The system depicted in FIG. 1 includes one or more user systems 102 through which users at one or more geographic locations may contact the host system 104. The host system 104 executes computer instructions for managing privileged documents and the user systems 102 are coupled to the host system 104 via a network 106. Each user system 102 may be implemented using a general-purpose computer executing a computer program for carrying out the processes described herein. The user systems 102 may be personal computers (e.g., a lap top, a personal digital assistant) or host attached terminals. If the user systems 102 are personal computers, the processing described herein may be shared by a user system 102 and the host system 104 (e.g., by providing an applet to the user system 102).

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 102 may be coupled to the host system through multiple networks (e.g., intranet and Internet) so that not all user systems 102 are coupled to the host system 104 through the same network. One or more of the user systems 102 and the host system 104 may be connected to the network 106 in a wireless fashion. In one embodiment, the network is an intranet and one or more user systems 102 execute a user interface application (e.g. a web browser) to contact the host system 104 through the network 106. In another exemplary embodiment, the user system 102 is connected directly (i.e., not through the network 106) to the host system 104 and the host system 104 is connected directly to or contains the storage device 108.

The storage device 108 includes data relating to managing privileged documents and may be implemented using a variety of devices for storing electronic information. It is understood that the storage device 108 may be implemented using memory contained in the host system 104 or it may be a separate physical device. The storage device 108 is logically addressable as a consolidated data source across a distributed environment that includes a network 106. Information stored in the storage device 108 may be retrieved and manipulated via the host system 104 and/or via the user system 102. The storage device 108 contains a data repository which includes a privileged schema and a non-privileged schema. Within each schema are one or more databases and associated database tables for storing documents and other discovery related data. Databases on the storage device 108 are contained in either the privileged schema or the non-privileged schema. The contents of the schemas are described below in reference to FIG. 2.

Databases within the privileged and non-privileged schemas contain documents and some or all of the documents are grouped into folders. There may be separate databases for different practice areas (e.g., labor, environmental, and intellectual property) and/or separate databases for different cases. The documents in the databases are typically scanned documents that are stored as images. It will be appreciated that a several related documents may be grouped together as a composite document such that the composite document may be treated as a single grouped document or each as individual documents in the LSA that can be separately or individually reviewed for document decisions. A detailed description of the related invention related to electronic management of composite documents in LSA is found in commonly assigned patent application docket number GP-303764 entitled "System and Method for Electronically Managing Composite Documents", filed the same day as the present application, Jul. 2, 2004 and which is herein incorporated by reference in its entirety. Having a privileged schema and a non-privileged schema allows privileged content to be stored separately from non-privileged content. Each schema contains its own database entities (e.g., tables, views, and triggers), entity relationships, data, access and security restrictions. Access to the privileged and non-privileged schemas is based on the security levels, or levels of authority, associated with individual users. The storage device 108 may also include other kinds of data such as a modification log (e.g., type of update, a user-id and date of update) to record updates to a privilege associated with a document. In an exemplary embodiment, the host system 104 operates as a database server and coordinates access to application data including data stored on storage device 108.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may also include a firewall to prevent unauthorized access to the host system 104 and enforce any limitations on authorized access. For instance, an administrator may have access to the entire system and have authority to modify portions of the system. A firewall may be implemented using conventional hardware and/or software as is known in the art.

The host system 104 may also operate as an application server. The host system 104 executes one or more computer programs to provide privileged document management functions. Processing may be shared by the user system 102 and the host system 104 by providing an application (e.g., java applet) to the user system 102. Alternatively, the user system 102 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Figure 2:
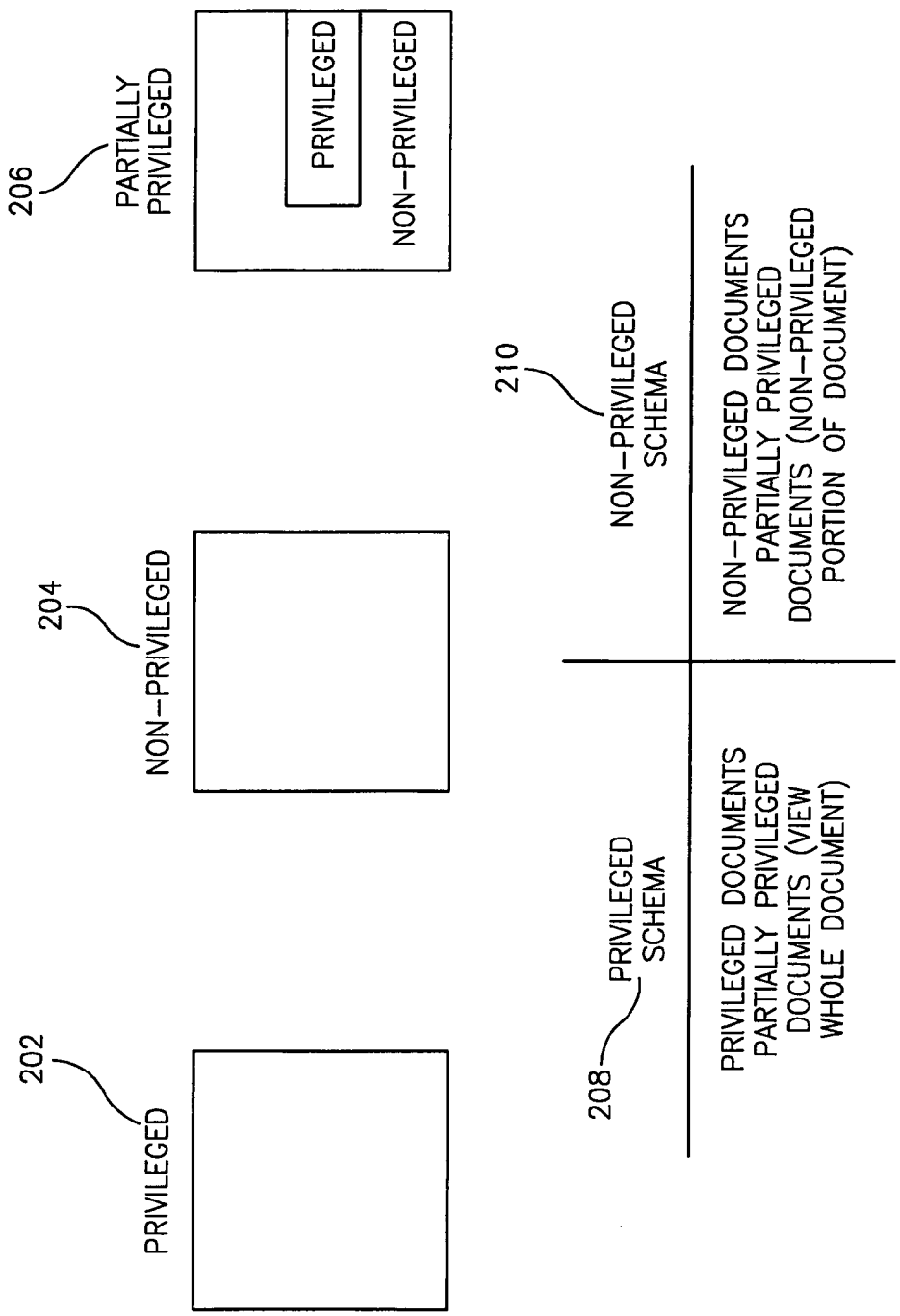
FIG. 2 is a block diagram of a non-privileged schema and a privileged schema utilized by exemplary embodiments of the present invention.

FIG. 2 is a block diagram of a non-privileged schema 210 and a privileged schema 208 utilized by exemplary embodiments of the present invention. As shown in FIG. 2, a document may be categorized as a privileged document 202, a non-privileged document 204 or a partially privileged document 206. A privileged document 202 is a document where the entire contents of the document are privileged. A non-privileged document 204 is a document containing no privileged information, or content. A partially privileged document 206 is a document where portions of the document content are non-privileged and other portions of the document are privileged. Documents may also be categorized based on the type of privilege treatment (e.g., attorney work product doctrine and attorney client privilege).

As shown in FIG. 2, a user who has access to the privileged schema 208 may access privileged documents 202 and partially privileged documents 206. When a user is viewing a partially privileged document 206 via the privileged schema 208, the partially privileged document 206 will have the privileged portion blacked out (i.e., redacted). Placeholder information may be written across the blacked out portion and may include data such as: redaction date, user, type and treatments. The user, via the privileged schema 208, will be able to access the privileged portion of the partially privileged document 206 by utilizing a toggle button or some other means to request access to the redacted portion. The fully privileged documents 202 will also be accessible by users who are logged on to the privileged schema 208.

Also as shown in FIG. 2, a user who logs on to the non-privileged schema 210 may access non-privileged documents 204 and the non-privileged portions of partially privileged documents 206. When a user is viewing a partially privileged document 206 via the non-privileged schema 210, the partially privileged document 206 will have the privileged portion blacked out (i.e., redacted). Placeholder information may be written across the blacked out portion and include data such as: redaction date, user, type and treatments. The user, via the non-privileged schema 210, will not be able to access the redacted portions of the partially privileged document 206. The non-privileged documents 204 will also be accessible to the user via the non-privileged schema 210.

The two schemas are implemented in order to support a requirement that privileged content be stored separately from non-privileged content. In an exemplary embodiment of the present invention, the privileged data will be physically removed from the non-privileged schema. If the document is partially privileged, then the privileged portions are physically removed from the document in the non-privileged schema. The LSA is preferably configured such that one single executable module can run against both schemas. However, the executable module will only run against one schema per user session. To switch between schemas, the user terminates the current user session by logging out of the LSA completely and logging back on to LSA and selecting the other schema. A user session is initiated when a user logs on to the LSA. A user that is logged on to the privileged schema is referred to herein as a privileged user and a user that is logged on to the non-privileged schema is referred to herein as a non-privileged user.

Access rights to the non-privileged schema 210 and the privileged schema 208 are based on individual users. For a user with access rights to both schemas, the LSA prompts the user to select one schema to work in for the duration of the session. For a user with access to only one schema, the LSA will direct the user into that schema. The LSA provides the same functionality in both schemas except where unique functionality is required in either schema. For example, the LSA will allow a user to apply a privileged redaction to a document in the non-privileged schema 210, but will prohibit the same action in the privileged schema 208. In addition, reports and screens created when logged on to the privileged schema 208 may include the letter "P" to designate that the data is sourced from the privileged schema 208.

Within each of the non-privileged schema 210 and the privileged schema 208, the LSA maintains a privilege status for each document. Privilege status refers to the collection of the following document attributes: privilege categorization, privileged redactions, and privilege treatments. Privilege categorization of a document is a general description of the level of privilege ascribed to a document. The privilege categorization of a document may include categories such as privileged, partially privileged or non-privileged. The default value for documents loaded in the non-privileged schema 210 is non-privileged and the default value for documents loaded into the privileged schema 208 is privileged. A privileged redaction may be applied to black out a privileged portion of a document. In an exemplary embodiment of the present invention, after a privileged redaction is applied to a document, the redacted content is permanently removed from the document in the non-privileged schema 210 by altering the document image. The presence of one or more redactions on a document will cause its privilege categorization to be partially privileged. In exemplary embodiments of the present invention, privilege treatments include attorney client privilege (ACP) and attorney work product doctrine (AWPD). The treatments are stored at the document level for privileged documents 202 and at the redaction level for partially privileged documents 206.

An exemplary embodiment of the present invention includes tools in the LSA that will allow a user, with the proper authority, to modify the privilege status of documents. In general, the tools will allow a user to increase the privilege status of a document (e.g., to increase the privilege categorization, to apply a privileged redaction, and to modify privilege treatments). These tools will not allow a user to decrease a document's privilege status (e.g., decrease the privilege categorization, and remove a privileged redaction). The ability to decrease a document's privilege status, however, may be provided to a system administrator to correct cases where an incorrect privilege was applied. A system administrator may be able to set up different access rights (e.g., the ability to decrease the privilege status of a document, and the ability to allow for the production of a privileged document when required by law or in response to a court order) for particular users when selected access rights for a user are required. Documents are reviewed and decisions (e.g., production status, privilege status and privilege category) applied to documents by users with access to the LSA as well as by remote reviewers who do not have access to the LSA. A detailed description of the invention of LSA for remote review of documents is found in commonly assigned patent application docket number GP-303765 entitled "System and Method for Electronically Managing Remote Review of Legal Documents", filed the same day as the present application Jul. 2, 2004 and which is herein incorporated by reference in its entirety.

Figure 3:
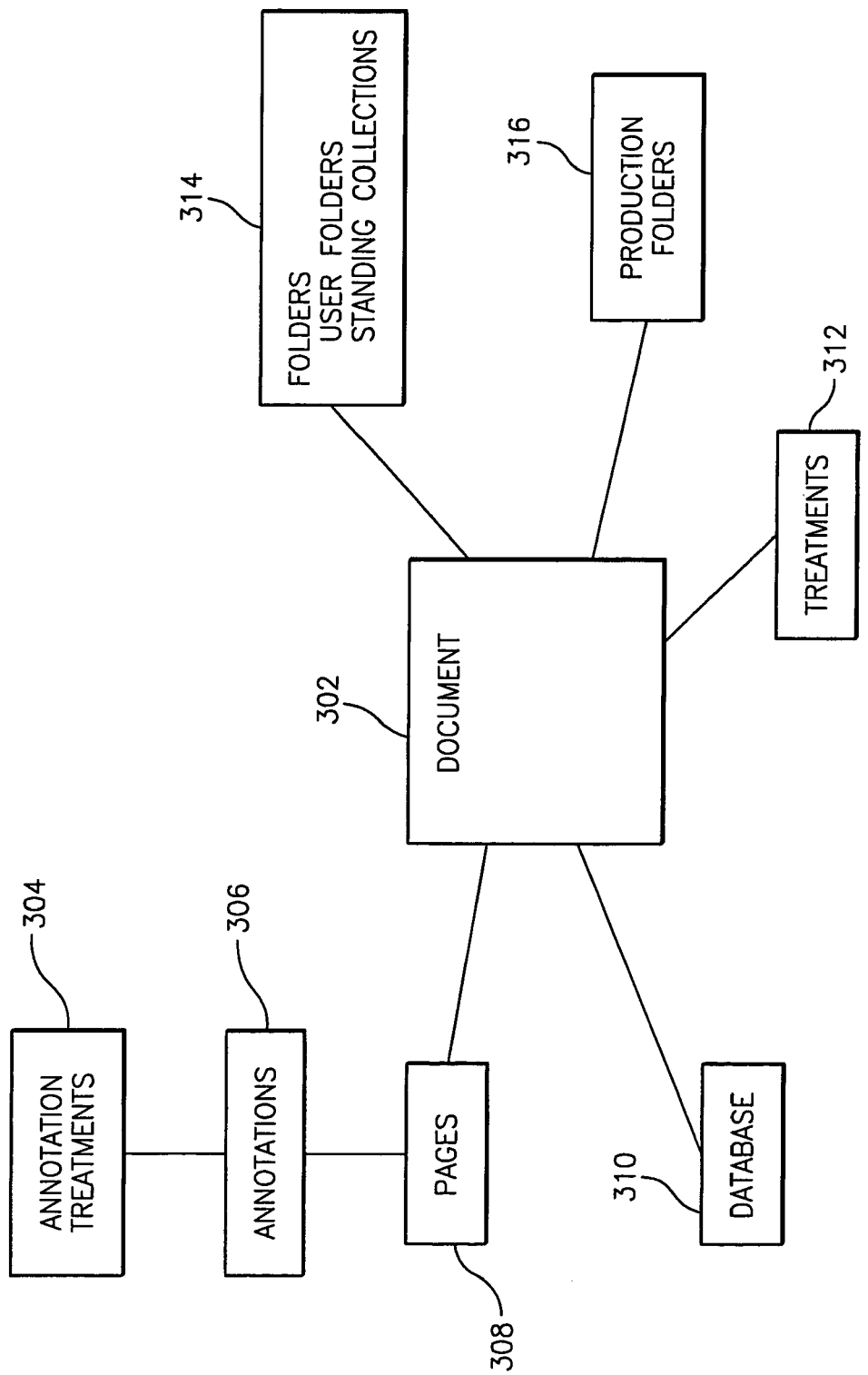
FIG. 3 is a block diagram of database tables utilized by exemplary embodiments of the present invention.

FIG. 3 is a block diagram of database tables utilized by exemplary embodiments of the present invention. The document table 302 includes a record for each document. The document table 302 includes fields related to a document and to the privilege status of the document. In an exemplary embodiment of the present invention the document table 302 includes fields for: a unique document identifier; a database identifier to identify the database where the document is located; an indicator to indicate if the privilege status of the document has been changed since the document was initially loaded into the database; a privilege status (e.g., partially privileged, privileged, and non-privileged); a document privilege category; an indication of whether there is a proposed privilege associated with the document; a proposed privilege status; a separation indicator and date to indicate if the proposed privilege has been applied to the document; and document related fields such as case number, product information and issue information. In addition, dates and user-ids associated with any updates are also contained in fields in the document table 302. A typical document table 302 may include over a hundred fields for searching on characteristics of the document, the examples described herein are utilized by exemplary embodiments of the present invention to manage privileged documents.

Also shown in FIG. 3 is a folders table 314 to specify the connection between a document and one or more folders. A subset of the fields in the folders table 314 includes a unique folder identifier, a document identifier and a database identifier for the folder. FIG. 3 also depicts a production folders table 316 which may include fields such as: a unique production document identifier; a production folder identifier; a production identifier; a document identifier that points to the source document in the document table 302 (referred to in the production process as the master document); a production privilege category; a flag to identify if the privilege status has changed since the document was associated to the production folder but before it was locked; a flag to identify if the privilege status has changed since the document was locked in the production folder; and a field to indicate if the document has a proposed privilege status. A locked production document is defined as a document included in a production folder where all production activities such as production numbering and printing has been completed and in which production decisions can no longer be modified. An unlocked production document is defined as a document included in a production folder where a new production decision or a modification of an existing production decision can be applied to the document. Also advantageously, the LSA allows the user to adopt documents and their prior decisions, such as decisions associated with a similar prior production instance, so that additional review of the same documents is not required. This feature is enabled since the LSA beneficially stores all documents and all historical prior decisions associated with the documents, thereby enabling efficiency of document identification by the LSA user and expedited review of documents relating to similar type of legal matters or production instances. A detailed description of the invention of LSA having this feature is found in commonly assigned patent application docket number GP-303763 entitled "System and Method for Electronically Managing Discovery Pleading Information", filed the same day as the present application Jul. 2, 2004 and which is herein incorporated by reference in its entirety.

Document records in the LSA are categorized into two separate instances: the master instance, which is the permanent or default copy of the document stored in the document table 302, and the production instance, which is a copy of the document used for a particular production. A production refers to discovery information that is delivered to an opposing counsel in response to a request for information. Each document has only one master instance; however, each time a document is associated to a production folder via the production folders table 316, a new and unique production instance is created for that document. The document table 302 provides fields for managing the master instances of these documents and as described above, may include fields for privilege status, proposed privilege status, and protection treatments of the documents' master instances. This, or another subset of fields from the document table 302, may be designated as master status fields. When master status fields are updated in the master instance of the document, these fields are also updated in any production instances of the document. Protection treatment refers to a document owner classification such as confidential and internal use.

Also shown in FIG. 3 is a treatments table 312 that includes fields such as a privilege treatment identifier, a document identifier, a privilege treatment type and a privilege treatment status. Also shown is a pages table 308 for tracking pages associated with a document. The pages table 308 includes data such as a page identifier, a document identifier, a page sequence number and an image file name. The annotations table 306 includes fields for tracking information related to redactions in the document on specific pages. The fields in the annotations table 306 may include: an annotation identifier; a document identifier (to associate the annotation with a document); a page identifier (to associate the annotation with a page in the document); an annotation type; a left, right, bottom and top coordinate for the redaction; and an annotation status field to indicate if the annotation is proposed or applied (i.e., applied). The annotations treatment table 304 includes fields to identify the privilege treatment associated with an annotation in the annotations table 306 and includes content similar to the treatments table 312. The database table 310 includes fields to associate a document to a particular database. A subset of the possible fields in the tables depicted in FIG. 3 have been described. The subset of the fields described herein are utilized to manage the privilege status of the document.

Figure 4:
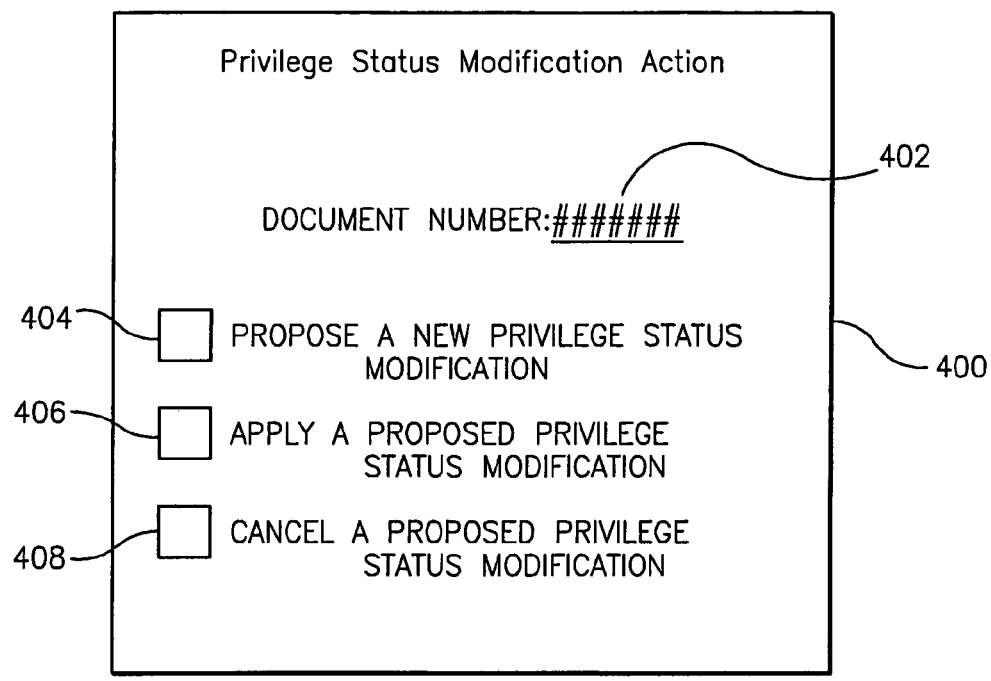
FIG. 4 is an exemplary privilege status modification user interface screen for selecting a privilege status modification action.

FIG. 4 depicts a user interface for modifying the privilege status of a document. In exemplary embodiments of the present invention, modifying the privilege status of a document includes a propose process and an apply process. In the first step, the user proposes a privilege status, or designation, by changing the privilege categorization, drawing a privileged redaction, and/or modifying privilege treatments. The user saves the proposed modification to the database through a save command. A proposed privilege status modification is considered temporary and may be deleted at any time. A proposed privilege status is stored in the document table along with a proposed modification while maintaining the original document privilege status. The proposed privilege status modification is maintained until the user cancels the proposal or accepts the proposal. When the user accepts (or approves) the proposed privilege status modification, the new privilege status is applied to the document. As part of the apply process, a series of functions, as described below in reference to FIG. 6 are performed. Which functions are performed depends on the type of privilege modification made, the schema in which it was made, and the modification history of the document.

The LSA will allow a user to add multiple proposed privilege status modifications for a document. For example, a user may propose to add many privileged redactions to a non-privileged document 204 before accepting and applying them to the document. As another example, for a given partially privileged document 206 with one privileged redaction that has one privilege treatment, a user may propose to add a second privilege treatment to that redaction and propose to add another privilege redaction to the document before accepting and applying the additional treatment.

A series of proposed privilege status modifications on a document may result in a final proposed privilege status that is equal to the current privilege status of the document. For example, given a privileged document 202 treated with ACP, a user may first propose to change the treatment to AWPD, and subsequently propose to remove the AWPD. The resultant proposed privilege status would be equal to the privilege status before the initial proposal and since the most recent proposed privilege status was applied (if any). To accommodate this situation, the LSA will evaluate the proposed privilege status after each proposed privilege modification. If that modification results in a proposed privilege status equal to the current privilege status, the LSA will present a notice to the user stating "there are no remaining proposed privilege status modifications for this document." This notice is strictly informational and will require the user to dismiss the notice (e.g., by clicking the OK button on the notice screen).

As the user proposes privilege status modifications to a document, the LSA will store the dates and user-ids associated with the proposals in the tables depicted in FIG. 3. The LSA will also store dates and user-ids for the general proposed privilege status; the date of the proposed privilege status will be considered to be the date of the most recently proposed privilege status modification. For example, if a user has proposed several privileged redactions to a document, the LSA will store the date and user-id of the last proposed privileged redaction as the date and user-id of the proposed privilege status.

The user may apply all proposed privilege status modifications at once with one accept action. The user is not required to accept the saved proposed modifications prior to closing the LSA or exiting the document. In an exemplary embodiment of the present invention, the LSA will prompt the user to decide to accept and apply all proposed status modifications prior to closing the application or advancing to a different document.

As shown in the privilege status modification user interface screen 400 of FIG. 4, a document number 402 has been selected by the user. The document number provides an identifier for the document and may be any format including numeric, alphanumeric, etc. This document is referred to herein as an original document because it represents the document before privilege status modification actions have been applied to the document. The document may be selected in a variety of manners including via a user interface screen that displays, for example, all documents within a particular folder or all documents not assigned to folders with particular key values or all documents with particular key values. In another exemplary embodiment, a user interface screen may list all documents that have proposed privilege modifications of particular types and the user may be prompted to select from this list. In addition to the document number 402, other descriptive material related to the document may also be displayed (e.g., current privilege status, and document title).

Referring to FIG. 4, the user may select the first option 404 to propose a new privilege status modification. If the user selects this option, then, the propose a new privilege status user interface screen 500 depicted in FIG. 5 will be presented to the user. The propose a new privilege status user interface screen 500 includes the document number 402 and optionally, other descriptive material related to the document. The user may select the privileged option 502, the partially privileged option 504 and/or the change privilege treatment option 506. The actual options presented to the user may be different depending on the current privilege status of the document and the schema that the user is currently logged on to. For example, the change privilege treatment option 506 would not be displayed or would be disabled for documents with a current privilege status category of non-privileged.

The LSA allows a user to modify a document's privilege status in either the non-privileged schema 210 or the privileged schema 208. In the non-privileged schema 210, the LSA allows a user to modify a document's privilege categorization, add a privileged redaction, or modify the privilege treatment(s) of a privileged redaction or a privileged document (but only for documents that were initially loaded into the non-privileged schema). In the privileged schema 208, a user can modify the privilege treatment(s) of a privileged document (but only for documents that were loaded directly into the privileged schema).

Proposing a modification to a document in either schema will result in that document (the document and corresponding unlocked production documents) acquiring a proposed privilege status. The proposed privilege status is acquired by the documents in a real time manner once the user has proposed a privilege status. The proposed privilege status is indicated in fields contained in the document table 302 and the production document table 316.

In exemplary embodiments of the present invention, the user must accept (i.e., approve) and apply the proposed privilege status modifications to tables in the database associated with the document in order to impose the proposed privilege status on the document. After proposing modifications, but prior to accepting and applying them, the user may wish to exit out of the document (e.g., by closing the document viewer) and/or switch to a new document. In an exemplary embodiment of the present invention, if a user attempts to leave the document with an unapplied proposed privilege modifications, the LSA presents the user with a notice stating "You are attempting to leave this document with unapplied proposed privilege status modifications. Do you wish to accept and apply these changes before leaving the document?" The notice provides three options: "yes", "no" and "cancel." Selecting "yes" accepts and applies the proposed privilege status modifications to the document and completes the operation of opening the next document or closing the document viewer. Selecting "no" will not accept and apply the proposed privilege status modifications to the document and will complete the operation of opening the next document or closing the viewer. Selecting "cancel" will not accept and apply the proposed privilege status modifications to the document and will cancel the operation of opening the next document or closing the viewer.

Figure 5:
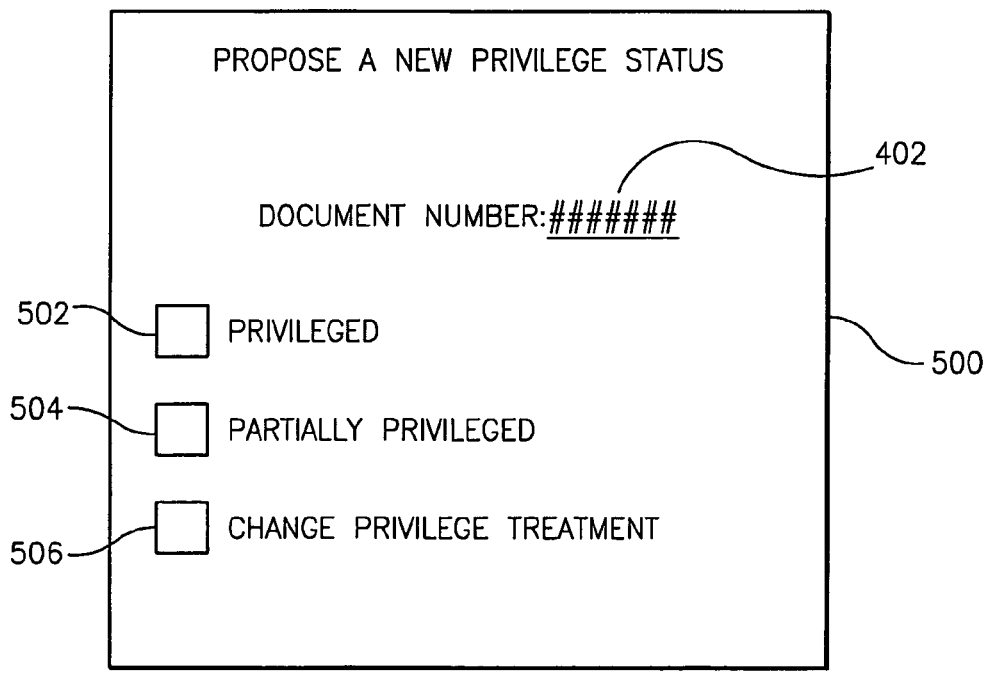
FIG. 5 is an exemplary user interface screen for proposing a new privilege status.

If the user selects the privileged option 502, in FIG. 5, then the proposed status of privileged is associated with the entire document. This option is available for documents in the non-privileged schema 210 that currently have a privilege categorization of partially privileged or non-privileged. In exemplary embodiments of the present invention, the proposed privilege status modification is associated with the document by updating values in the document table 302 so that systems and users that access the document are notified of the proposed privilege status modification. In addition, the user is prompted to supply a privilege treatment (e.g., ACP, and AWPD) to be associated with the redaction. Fields in the document table 302 and treatments table 312 are updated to reflect the proposed status.

If the user selects the partially privileged option 504, in FIG. 5, then the user is prompted to specify the portion of the document that should be redacted (e.g., via a computer tool executing on the host system 104 or the user system 102 to draw the redaction over a portion of the document image). Data related to the proposed redaction is stored in the annotations table 306. In addition, the user is prompted to supply a privilege treatment (e.g., ACP, and AWPD) to be associated with the redaction. This is stored in the annotations treatment table 304. Further, records in the document table 302 and any associated production document table 316 records are updated to reflect the proposed privilege modification. In an exemplary embodiment of the present invention, the schemas include a pages table 308, an annotations table 306, an annotation treatments table 304, and a document table 302.

Referring to FIG. 5, the user may select the change privilege treatment option 506 from the propose a new privilege status user interface screen 500. This option is available for documents in the privileged schema 210 that have a privilege categorization of partially privileged and to documents in the privileged schema 208 that have a privilege categorization of privileged. The user is prompted to select a privilege treatment. In exemplary embodiments of the present invention, the privilege treatment options include ACP and AWPD. The document table 302 and treatments table 312 are updated to reflect the proposed modification. In addition, any records in the production document table 316 that correspond to the document are updated to reflect the proposed modification.

The creation of a proposed privilege status modification has an impact on the production of documents. For example, documents that have been proposed as privileged are automatically placed on hold and prevented from being produced. The impact of a proposed privilege modification on the production of documents will be discussed further herein below.

Referring back to FIG. 4, the user may select the second option 406 to accept and apply the proposed privilege status modification. This causes a series of apply functions to be performed in a real time manner (e.g., the functions are initiated immediately, or within seconds of the user accepting the proposed privilege status modification). When the modification is applied in the non-privileged schema, these functions include migrating relevant data from document and document-related entities in the non-privileged schema 210 to the privileged schema 208. This migration process is referred to herein as document separation. The LSA migrates the document image, and data from the document related tables (e.g., document table 302, treatments table 312, pages table 308, annotations table 306, annotation treatments 304 and database table 310), folder related tables (e.g., folders table 314) and production related tables (e.g., production document 316) to the privileged schema 208 depending on the privilege status modification history of the document acquiring new privilege status. Upon the first modification of the document, the LSA will insert relevant document and document-related records in the privileged schema. Upon each subsequent modification, the LSA will update existing records in the privileged schema 208. In both cases, the LSA will update folder-related data to recreate the structures of the folders containing the document at the time of separation.

Documents receiving privilege status modifications may be located in one or more folders. When separating a document (i.e., applying the proposed privilege status modification), the LSA will automatically create the structure(s) of the folders containing the document in the privileged schema 208. In this manner, a user may log into the privileged schema 208 and access the partially privileged document through the same folder structure as that in the non-privileged schema 210.

Referring to FIG. 4, the user may select the third option 408 to cancel a proposed privilege status modification. Canceling a proposed privilege status modification will result in either the removal of the proposed privilege status or an updated proposed privilege status, depending on the remaining proposed privilege status modifications existing for the document. Canceling a document's only proposed privilege status modification will result in the removal of the proposed privilege status of the document from the database tables. For example, if the user proposes one privileged redaction to a non-privileged document 204, and subsequently deletes that privileged redaction, the document's proposed privilege status will be removed. For these situations, the LSA presents the user with a notice such as "There are no remaining proposed privilege status modifications for this document." The user will dismiss the notice by selecting an "OK" button on the user interface screen. Canceling one of many proposed privilege status modifications will result in the retention of the proposed privilege status of the document. The new date and user-id of the proposed privilege status in the document table 302 is the date when the proposed modification was canceled and the user-id of the user who canceled it. The tables depicted in FIG. 3 are updated to reflect the canceling of the proposed privilege modification.

FIG. 6 is a table of exemplary privilege status modification actions and their impact on the non-privileged schema 210 and the privileged schema 208 when a proposed privilege status modification is applied. The first action 602 is a partial privilege being applied to a non-privileged document 204. This would occur, for example, when a first redaction is applied to a document via the non-privileged schema 210. A copy of the document image and document related tables are moved to the privileged schema 208 with the new privilege status and the annotation data. In addition, folder related data (if the document is contained in any folders) is migrated to the privileged schema 208. Further, the modification log is updated to reflect the modification. Also as part of the first action 602, applying a partial privilege to a non-privileged document 204, the privileged portion of the document image as specified by the redaction is physically removed from the copy of the document in the non-privileged schema 210. In this manner, access to privileged portions of the document is disabled from the non-privileged schema 210. The document related data and production document related data in the non-privileged schema 210 are updated with the new privilege status and reference to the redacted document. The production document records (both locked and unlocked) are updated to reflect the new image reference in the non-privileged schema 210.

The second action 604 depicted in FIG. 6 is a new partial privilege being applied to a partially privileged document 206. This would occur, for example, when a second or subsequent redaction is applied to a document via the non-privileged schema 210. The copy of the document image and document related data in the privileged schema 208 are updated with the new privilege status and a copy of the annotation data. In addition, folder related data (if the document is contained in any folders) is updated in the privileged schema 208. The modification log is updated to reflect the modification. Also as part of the second action 604, applying a new partial privilege to a partially privileged document 206, the privileged portion of the document image as specified by the redaction is physically removed from the copy of the document image in the non-privileged schema 210. Data records in the document-related data tables and production related tables in the non-privileged schema 210 are updated with the new privilege status and reference to the redacted document. The production document records (both locked and unlocked) are updated to reflect the new image reference in the non-privileged schema 210.

The third action 606, in FIG. 6, is a full privilege (i.e., privilege applicable to the whole document) being applied to a non-privileged document 204. This would occur, for example, when a user specifies that the entire document should be classified as privileged. When privilege is applied to the full document, the document image and document related data are moved to the privileged schema 208 with the new privilege status. In addition, folder related data (if the document is contained in any folders) is updated in the privileged schema 208. The modification log is updated to reflect the modification. Also as part of the third action 606, classifying a document as privileged, the document image and document related data are removed from the non-privileged schema 210. A placeholder and subset of the document related data remain in the non-privileged schema 210. The subset set of data retained in the non-privileged schema includes basic system identifying information such as the document's system generated accession number and the date on which the document was transferred to the privileged schema. Information that may contain privileged content such as document titles and authors are removed from the non-privileged schema and transferred to the privileged schema. The production document records (both locked and unlocked) are updated to reflect that the document is now privileged.

The fourth action 608, in FIG. 6, is a full privilege (i.e., privilege applicable to the whole document) being applied to a partially privileged document 206. This would occur, for example, when a user specifies that the entire document should be classified as privileged. When privilege is applied to the full document, the document image and document related data are moved to the privileged schema 208 with the new privilege status. In addition, folder related data (if the document is contained in any folders) is updated in the privileged schema 208. The modification log is updated to reflect the modification. Also as part of the fourth action 608, classifying a document as privileged, the document is removed from non-privileged schema 210. A placeholder and subset of the document related data remain in the non-privileged schema 210. The production document records (both locked and unlocked) are updated to reflect that the document is now privileged. Any redactions applied previously are retained by the system and displayed to the user via the privileged schema 208.

In addition to the above privilege status modifications, the privilege treatments of the annotations and/or the document may be updated in the privileged schema 208. The privilege treatments may be updated to reflect ACP, AWPD or both ACP and AWPD. When a proposed privilege status modification containing a privilege treatment update for the document is applied, the document table 302 and the treatments table 312 are updated to reflect the new treatment. Similarly, when a proposed privilege status modification containing a privilege treatment update for a privileged redaction is applied, the document table 302, annotations table 306 and annotation treatments table 304 are updated to reflect the new treatment. In addition, the modification log is updated to reflect the modification.

A user can propose and apply a privilege status modification to the document either inside or outside the context of a production. Each production document is associated with a document (referred to as a master document in the production context). Proposing and applying a privilege status modification to a master document will result in the same modification being imposed on all corresponding unlocked production documents. Proposing and applying a privilege status modification to an unlocked production document will result in the same modification being imposed upon the document and all other corresponding unlocked production documents. In an exemplary embodiment of the present invention, the LSA will prohibit the modification of the privilege status of a locked production document, either directly through a user interface screen or as a result of privilege status modifications to the master and corresponding unlocked production documents. The master document and all corresponding locked and unlocked production documents will refer to one document image (or set of images for multi-page documents). Therefore, the image(s) of the master document and corresponding locked and unlocked production documents will always reflect the most recently applied privilege modification.

A privilege status modification to a document will impact the production decisions of corresponding unlocked instances of that document where they exist in production folders. After the proposal and apply steps of a privilege status modification of a document in a production folder, the LSA will change the production decisions of those documents. After the proposed privilege modification is entered, documents in an unlocked production folder with an initial decision of "no decision" and "produce" will have their decision changed to "hold." Documents with an initial decision of "hold" and "do not produce" will retain their initial decisions. Updates to the decision fields are performed to prevent inadvertent disclosure of possibly privileged information during a production of the documents. Once the apply occurs, all documents with decisions of "hold" (both those changed during the proposal and those with initial decisions of "hold") will remain with a decision "hold." In exemplary embodiments of the present invention, the decision fields may be modified by a user. In alternate exemplary embodiments of the present invention, the decision fields may only be modified by a system administrator.

Figure 7:
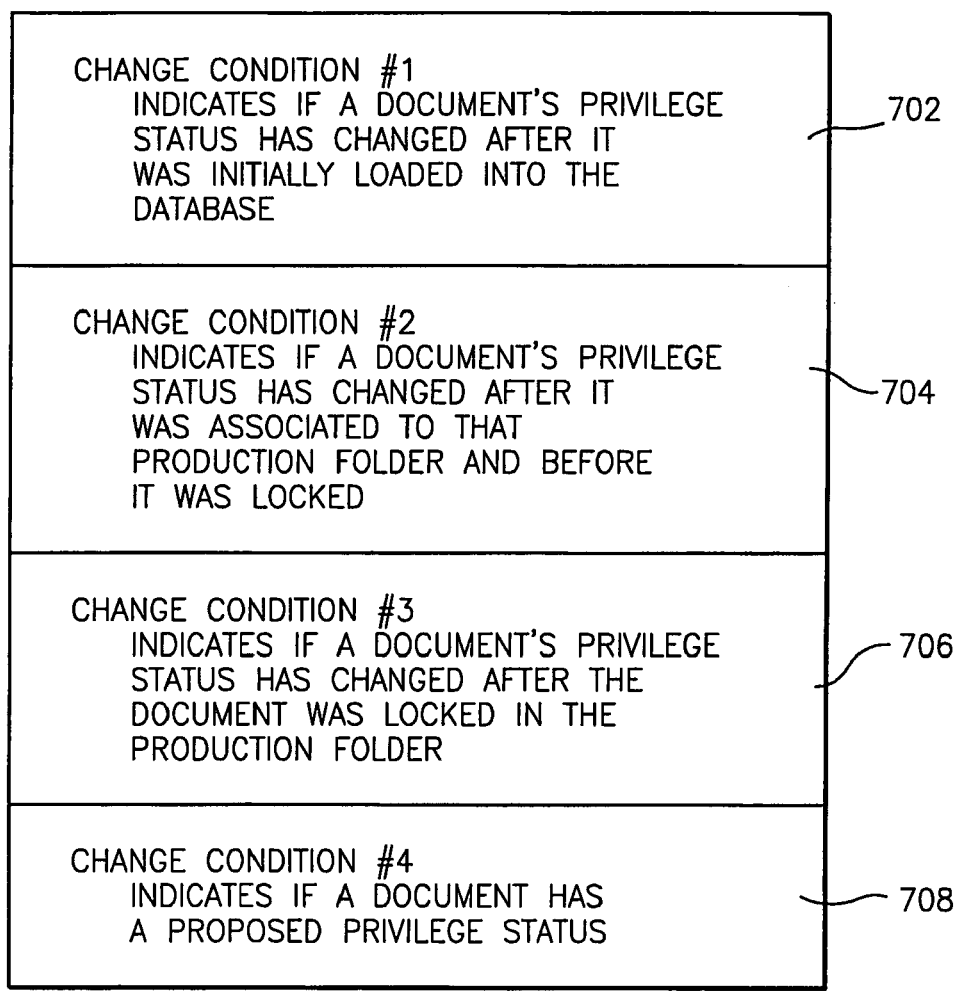
FIG. 7 is a table of exemplary change condition codes utilized by exemplary embodiments of the present invention.

The LSA maintains four Boolean (i.e., "true"/"false") attributes to track privilege status modifications. These document attributes are collectively referred to as the privilege status change conditions and are listed in the table in FIG. 7. Change condition one 702 indicates if a document's privilege status has been changed after the document was initially loaded. Change condition one 702 applies to documents. The indicator for change condition one 702 is stored in the document table 302. Change condition two 704 applies to documents in a production folder and it indicates if a document's privilege status has changed after it was associated to the production folder and before it was locked. The indicator for change condition two 704 is stored in the production folders table 316. Change condition three 706 applies to documents in a production folder. Change condition three 706 indicates if a document's privilege status has changed after the document was locked in the production folder. The indicator for change condition three 706 is stored in the production folders table 316. Change condition four 708 applies to documents (referred to as master documents in productions) and to documents in a production folder and it indicates if a document has a proposed privilege status. Indicators for change condition four 708 are stored in the document table 302 and the production folders table 316. All of the privilege status change conditions for a document have an initial value of "false." Any of change condition one 702, change condition two 704 or change condition three 706 will be set to true after a user completes (i.e., proposes and applies) a privilege status modification. Change condition four 708 will be set to true when a user proposes a privilege status modification, and will be set to false when the user applies the privilege status modification.

The LSA notifies the user of a subset of the above privilege status change conditions as a part of associating documents to a production, producing documents, or reprinting documents. When a user associates unlocked production documents to a production folder, the LSA indicates to the user the documents for which change condition four 708 (document has a proposed privilege status) and change condition two 704 (document privilege status has changed since document was associated to production folder and before document was locked) are true. When the user associates locked production documents to a production folder, the LSA will indicate to the user the documents for which change condition four 708 (document has a proposed privilege status) and change condition three 706 (document privilege status has change since document was locked in a production folder) are true. When a user produces a set of documents, the LSA will indicate the documents for which change condition four 708 (document has a proposed privilege status) and change condition two 704 (document privilege status has changed since document was associated to production folder and before document was locked) are true. When a user reprints a production, the LSA will indicate the documents in the production for which change condition four 708 (document has a proposed privilege status) and change condition three 706 (document privilege status has change since document was locked in a production folder) are true. When reprinting a production, the user will not be able to re-print the newly privileged content of the document or the portions of the document that are subject to a proposed privileged status.

The change condition data may be accessed in a variety of manners and not just through the functions of association, production and production reprints. For example, documents with change condition one 702 (document privilege status has changed since initial load) and/or change condition four 708 (document has a proposed privilege status) may be identified through the presence of a message in the document viewer screen, via a message in a screen displaying the properties of a master document, and/or via a query applied to all documents in a selected folder or with particular key values. The presence of change condition two 704 (document privilege status has changed since document was associated to production folder and before document was locked) and change condition three 706 (document privilege status has change since document was locked in a production folder) may be visible through a production management application for documents in a production folder.

Exemplary embodiments of the present invention provide notification to users when the privileged status of a document has changed or when a change in privilege status in under consideration. If a document changes its privilege status after is has been included in a production, users are notified of the change in status. If a document is under consideration for a change in privilege status (proposed privilege) after it has been included in a production, users are notified of this proposed status change. Additionally, users are prevented from inadvertently producing privileged material or material that is under consideration for a privilege status change in which case the document is placed on "hold." A user cannot set to "produce" a document that has material under consideration for a privilege status change.

Exemplary embodiments of the present invention provide a set of canned reports such as a pending privilege report, a document privilege status report and a modification log report. Additional reports may be created using ad hoc reporting tools to create reports to run against any of the fields in the tables depicted in FIG. 3.

Exemplary embodiments of the present invention include a two step privilege modification process that may be utilized to provide early notification of the existence of possible privilege data. Early notification may prevent inadvertent disclosure of privileged materials. In addition, the use of two schemas, the physical removal of redacted material from the non-privileged schema 210, and the mechanism by which unlocked production documents have their status changed when a proposed privilege change is pending may lead to more security for the privileged documents and to less chance of inadvertent disclosure. Further, the use of privilege status change indicators can lead to better communication with the users about the privilege status of the documents. Privilege identification may be performed in real time during an online review process and the privileged material that is identified is immediately transferred to a dedicated privileged schema.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for electronically managing privileged and non-privileged documents in which a document may be managed as partially privileged where a portion of the document content is privileged and the remainder of the document content is non-privileged, comprising: a privileged schema for storing privileged document content including the full content of partially privileged documents, the privileged document content is document content tat has been identified as being immune from discovery pursuant to at least one of attorney client privilege and attorney work product doctrine; a non-privileged schema for storing non-privileged document content including the non-privileged content only of partially privileged documents, where the privileged and non-privileged schemas are independent of one another so that privileged and non-privileged document content is not commingled, whereby privileged document content is protected from inadvertent production and waiver of at least one of attorney client privilege and attorney work product doctrine; and means for copying the full content of an individual partially privileged document to the privileged schema; and means for removing the privileged document content of the individual partially privileged document from the non-privileged schema.

2. A system for electronically managing the designation of a document or portion thereof as privileged, comprising: a privileged schema for storing privileged documents which are documents that have been identified as being immune from discovery pursuant to at least one of attorney client privilege and attorney work product doctrine; a non-privileged schema for staring non-privileged documents; means for enabling a user to propose a privilege designation for a document in the non-privileged schema, the privilege designation includes a designation identifying the document as being immune from discovery pursuant to at least one of attorney client privilege and attorney work product doctrine; means for immediately placing a hold on the document for which the privilege designation has been proposed to prevent the document from being produced in a proceeding; means far noticing users and approvers who access the document of the privileged designation proposed; means for enabling approvers to approve the privilege designation proposed; and means operative immediately upon approval of the proposed privilege designation for moving the document to the privileged schema, thereby to minimize the opportunity for errors in managing the designation of the document as privileged and to avoid inadvertent production of the document and consequent waiver of at least one of attorney client privilege and attorney work product doctrine.

3. A method for managing a partially privileged document where a portion of the document content is privileged and the remainder of the document content is non-privileged, the method comprising:

storing an individual document in a non-privileged schema;

determining that the individual document includes document content that is privileged;

copying the full content including the document content that is privileged of the individual document from the non-privileged schema to a privileged schema, the document content that is privileged is document content that has been identified as being immune from discovery pursuant to at least one of attorney client privilege and attorney work product doctrine; and removing the document content that is privileged of the individual document from the a non-privileged schema, wherein the document content that is privileged is not accessible via the non-privileged schema.

4. The method of claim 3 wherein a user session allows the user to access one of the privileged schema and the non-privileged schema.

5. A method for managing privileged documents, the method comprising:

receiving a proposed privilege status modification for a document, the privilege status of the document is designated privileged when the document has been identified as being immune from discovery pursuant to at least one of attorney client privilege and attorney work product doctrine;

notifying a user of the document of the proposed privilege status modification;

accepting the proposed privilege status modification; and applying the proposed privilege status modification to the document in response to the accepting.

6. The method of claim 5 wherein the proposed privilege status modification includes redacting a privileged portion of the document.

7. The method of claim 6 wherein the applying includes disabling access to the privileged portion of the document when the document is accessed via a non-privileged schema.

8. The method of claim 6 wherein the applying includes providing access to the privileged portion of the document when the document is accessed via a privileged schema.

9. The method of claim 6 wherein the applying includes storing a copy of the document in a non-privileged schema with the privileged portion deleted and storing a copy of the document in a privileged schema with the privileged portion accessible.

10. The method of claim 5 wherein the proposed privilege status modification includes designating a privilege categorization of privileged to the document.

11. The method of claim 10 wherein the applying includes disabling access to contents of the document from a non-privileged schema.

12. The method of claim 10 wherein the applying includes permitting access to contents of the document from a privileged schema.

13. The method of claim 5 wherein the applying is initiated in real time after the accepting is completed.

14. The method of claim 5 wherein the applying is initiated less than ten seconds after the accepting is completed.

15. The method of claim 5 wherein the proposed privilege status modification includes adding a new privilege treatment to the document or changing an existing privilege treatment associated with the document.

16. The method of claim 5 wherein the proposed privilege status modification includes adding anew privilege treatment to a redacted portion of the document or changing an existing privilege treatment associated with the redacted portion of the document.

17. The method of claim 5 wherein the user is an unlocked production document that is associated with the document.

18. The method of claim 17 wherein the unlocked production document includes a current production decision value of no decision and the method further comprises replacing the current production decision with a value of hold in response to receiving the proposed privilege status modification.

19. The method of claim 17 wherein the unlocked production document includes a current production decision value of produce and the method further comprises replacing the current production decision with a value of hold in response to receiving the proposed privilege status modification.

20. The method of claim 5 further comprising notifying the user of the document of the applying.

21. The method of claim 5 wherein the user is an end user accessing the document via a user interface.

22. The method of claim 5 further comprising logging the proposed privilege status modification to a modification log.

23. The method of claim 5 further comprising logging the applying to a modification log.

24. The method of claim 5 wherein the notifying is initiated in real-time after the receiving is completed.

25. The method of claim 5 wherein the notifying is initiated less than ten seconds after the receiving is completed.

26. A method for managing privileged documents, the method comprising:
  storing a copy of a document in a non-privileged schema;
  storing a copy of the document in a privileged schema;
  deleting a privileged portion of the copy of the document in the non-privileged schema, the privileged portion having been identified as being immune from discovery pursuant to at least one of attorney client privilege and attorney work product doctrine, wherein the privileged portion of the document is not accessible via the non-privileged schema.

27. A system for managing privileged documents, the system comprising:
  a data repository; and
  a host system in communication with the data repository, the host system including instructions to implement a method comprising:
    receiving a proposed privilege status modification for a document stored in the data repository, the privilege status of the document is designated privileged when the document has been identified as being immune from discovery pursuant to at least one of attorney client privilege and attorney work product doctrine;
    notifying a user of the document of the proposed privilege status modification;
    accepting the proposed privilege status modification; and
    applying the proposed privilege status modification to the document in response to the accepting, wherein the applying includes updating the data repository.

28. The system of claim 27 wherein the data repository includes a non-privileged schema and a privileged schema.

29. The system of claim 27 wherein the data repository includes a document table, a treatments table, a folders table, a production folders table, a pages table, an annotations table and an annotation treatments table.

30. The system of claim 29 wherein the document table includes a field to indicate if a privilege status of the document has been updated since the document was initially loaded into the database.

31. The system of claim 29 wherein the production folders table includes a field to indicate if a privilege status of the document has changed after a production document corresponding to the document was associated to a production folder and before the production document was locked.

32. The system of claim 29 wherein the production folders table includes a field to indicate if a privilege status of the document has changed after a production document corresponding to the document was locked into a production folder.

33. The system of claim 29 wherein the document table includes a field to indicate if the document has a proposed privilege status.

34. The system of claim 29 wherein the production document table includes a field to indicate if a production document includes a proposed privilege status, wherein the production document is associated with the document.

35. A computer program product for managing privileged documents, the computer program product comprising:
  a storage medium readable by a processing circuit and storing instructions for execution by the processing circuit for performing a method comprising:
    receiving a proposed privilege status modification for a document, the privilege status of the document is designated privileged when the document has been identified as being immune from discovery pursuant to at least one of attorney client privilege and attorney work product doctrine;
    notifying a user of the document of the proposed privilege status modificati0n;
    accepting the proposed privilege status modification; and
    applying the proposed privilege status modification to the document in response to the accepting.

* * * * *